June 1, 1943.   G. A. STAIB   2,320,803

STOP MEANS FOR MICROMETER CALIPERS

Filed April 16, 1942

WITNESSES:
Thomas W. Kerr, Jr.
Hubert Fuchs

INVENTOR:
George A. Staib,
BY Paul & Paul
ATTORNEYS.

Patented June 1, 1943

2,320,803

UNITED STATES PATENT OFFICE 2,320,803

STOP MEANS FOR MICROMETER CALIPERS

George A. Staib, Norristown, Pa.

Application April 16, 1942, Serial No. 439,153

6 Claims. (Cl. 33—166)

This invention relates to stops for micrometer calipers, that is to say to means for automatically restoring the movable gauge point of the micrometer caliper to a pre-set position in relation to the fixed gauge point after having been temporarily moved from such position as is desirable in successively checking turned machine or tool parts which are intended to be all of the same diameter.

The chief aim of my invention is to provide a stop means of the kind referred to, which is inexpensive to produce in quantity; which can be readily applied to standard forms of micrometer calipers without requiring any changes either in their construction or their usual mode of operation; and which without difficulty can be adjusted to maintain the movable gauge point of the caliper in any desired pre-set position and also for the purpose of suiting it to the hand of the particular user.

Figure 1:
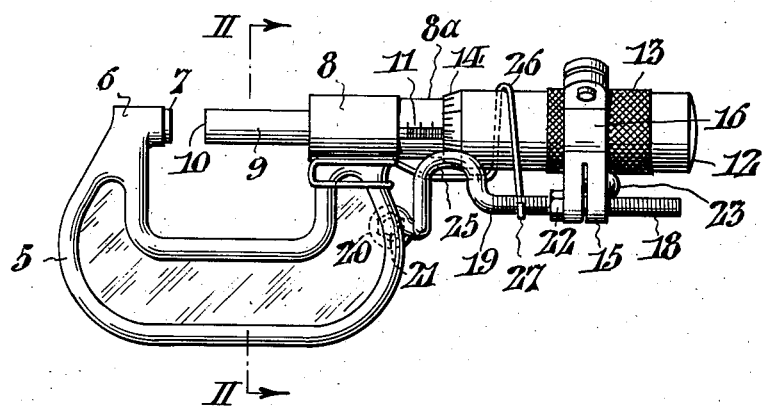
Figure 2:
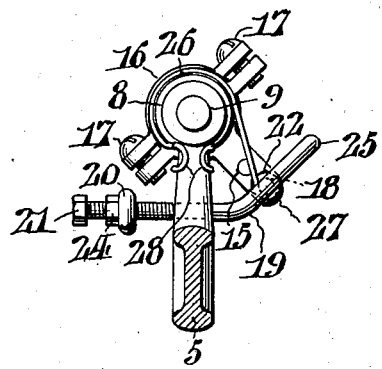

Other objects and attendant advantages will appear from the following detailed description of the attached drawing, wherein Fig. 1 is a perspective view of a micrometer caliper with stop means conveniently embodying my invention; and Fig. 2 is a cross sectional view taken as indicated by the arrows II—II in Fig. 1.

With more detailed reference to these illustrations, the numeral 5 comprehensively designates the jaw piece of the micrometer caliper which is of well known construction, said jaw piece having a head 6 on one of its extremities into which the fixed gauge point 7 of the caliper is set and a boss 8 on its other extremity which constitutes a bearing for the axially shiftable stem 9 of the movable gauge point 10. As ordinarily, the diametrically reduced extension 8a of the boss 8 is provided with graduations 11; and the stem 9 is adjustable endwise by means of the regulating thimble indicated at 12; whereof the medial portion 13 is knurled, and whereof the inner end is beveled and provided with vernier graduations 14 likewise as ordinarily.

The stop means with which my invention is more especially concerned includes an arm 15 which extends radially from a split collar 16 secured with capacity for circumferential adjustment, on the knurled medial portion 13 of the sleeve 12, said collar being fixable in adjusted positions by clamp screws indicated at 17. At its outer end, the arm 15 has a tapped bore to receive in parallelism with the axis of the thimble 12, the threaded end of the shank 18 of a carrier element 19 fashioned from stout wire. At its free end, the element 19 is formed with an eye 20 for passage of the shank of a headed stop screw 21. As a consequence of the construction just described, the shank 18 of the element 19 is not only rotatably adjustable in the arm 15, but also adjustable in the direction of its length, its adjustments being fixable by means of a clamp nut 22. From Fig. 1 it will be noted that the arm 15 is split longitudinally, and that a clamp screw 23 serves to draw together the split ends thereby assisting to prevent accidental displacement of the element 19 from the adjusted position. The stop screw 21 is in turn fixable in adjusted positions by means of a clamp nut shown at 24. From Fig. 1, it will be further observed that the element 19 is so shaped as to afford a projection 25 for engagement by a finger of one hand of the user of the caliper in a manner presently explained. The stop screw 21 is normally held yieldingly in contact with one side of the yoke piece 5 of the caliper as shown under the influence of a torsion spring which exerts its force counter-clockwise in Fig. 2 and which has a convolution 26 extending about the sleeve 11, one end of said spring engaging the shank 18 of the element 19 at 27 and the other end being fashioned into the form of a clip as shown at 28 to engage about the main extremity of the jaw piece 5 for anchorage thereon.

The use of the caliper when fitted with my improved stop means is as follows: The jaw piece 5 is held in the left hand as ordinarily, and the right hand is placed over the adjusting thimble 12, whereupon the thumb of the latter hand is utilized to press down upon the projection 25 on the stop carrier element 19 with the result that the arm 15 is rotated against the yielding resistance of the torsion spring 26. In this way the movable gauge point 10 is backed away from the fixed gauge point 7 so that the caliper can be applied to the article which is to be measured or gauged. With this accomplished, the projection 25 is released whereupon the spring 26 immediately reacts to reversely rotate the adjusting thimble 12 thereby causing the movable point 10 to contact the work after which a reading is taken with the scale graduations at 11 and 14. Due to the length of the shank 18 of the stop carrying element 19, the clamp collar 16 can be placed in any desired position along the length of the adjusting thimble 12 as may be necessary in pre-setting the adjustable gauge point 10 to different distances relative to the fixed gauge point 7. The rotative adjustment of the stop carrying element 19 in the end of the arm 15 permits placement of the projection 25 to suit the thumb position of the particular user of the caliper; while the adjustment of the stop screw 21 in the eye 20 of said element permits very accurate pre-setting of the movable gauge point 9 as will be readily understood by those skilled in the use of micrometer calipers.

Having thus described my invention, I claim:

1. Stop means for a micrometer caliper having a jaw piece with the fixed gauge point on one of its extremities and a bearing for the stem of an opposing shiftable gauge point on its other extremity, and a regulating screw thimble for shifting said movable point, said stop means including an arm with means for securing it to the thimble with capacity for circumferential adjustment thereabout; a stop independently adjustable on said arm and adapted to contact with the jaw piece at one side; and spring means operative to normally maintain the stop yieldingly in contact with said jaw piece.

2. Stop means for a micrometer caliper, characterized as in claim 1, wherein the stop is carried by a supporting element having a shank parallel to the axis of the regulating thimble and engaged with capacity for endwise adjustment in the outer end of the arm, and further including means for securing said element in adjusted positions.

3. Stop means for a micrometer caliper, characterized as in claim 1, wherein the stop is carried by a supporting element having a shank parallel to the axis of the regulating thimble and secured with capacity for adjustment in the outer end of the arm; and wherein the supporting element is constructed from stout wire with an offset loop which serves as a projection for convenience of manipulation of the stop means by a finger of the hand of the user.

4. Stop means for a micrometer caliper, characterized as in claim 1, wherein the stop is carried by a supporting element having a shank which extends parallel to the axis of the regulating thimble, and which is engaged with capacity for both rotative and endwise adjustment in the outer end of the arm, and further including means for securing said element in adjusted positions.

5. Stop means for a micrometer caliper, characterized as in claim 1, wherein the stop is carried by a supporting element having a shank which extends parallel to the axis of the regulating thimble and which is secured with capacity for both rotative and axial adjustment in the outer end of the arm; and wherein the stop is in the form of a screw adjustably set in the supporting element.

6. Stop means for use in connection with a micrometer caliper having a jaw piece with a fixed gauge point on one of its extremities and a bearing for the stem of an opposing shiftable gauge point on its other extremity, and a regulating screw thimble for said shiftable point, said stop means comprising an arm with means for securing it to the thimble with capacity for circumferential adjustment thereabout; a stop on said arm adapted to contact with one side of the jaw piece; a torsion spring operative to normally maintain the stop yieldingly in contact with the jaw piece, said spring having a convolution which extends about the regulating thimble, one end of said spring being anchored on said jaw piece and the other end being connected to the arm.

GEORGE A. STAIB.